United States Patent
Troxell (10) Patent No.: US 9,181,735 B2
(45) Date of Patent: Nov. 10, 2015

(54) FORCED ENTRY PRACTICE DEVICE FOR A DOOR

(75) Inventor: Daniel M. Troxell, New Market, MD (US)

(73) Assignee: TroxFire Training Solutions, LLC, Frederick, MD (US)

(*) Notice: Subject to any disclaimer, the term of this patent is extended or adjusted under 35 U.S.C. 154(b) by 329 days.

(21) Appl. No.: 13/329,749

(22) Filed: Dec. 19, 2011

(65) Prior Publication Data

US 2012/0156663 A1 Jun. 21, 2012

Related U.S. Application Data (60) Provisional application No. 61/424,981, filed on Dec. 20, 2010.

(51) Int. Cl.
| | |
|---|---|
| *G09B 19/24* | (2006.01) |
| *G09B 19/00* | (2006.01) |
| *E05C 1/04* | (2006.01) |
| *E05B 17/00* | (2006.01) |
| *E05B 15/16* | (2006.01) |

(52) U.S. Cl.
CPC ............... *E05C 1/04* (2013.01); *E05B 17/0062* (2013.01); *G09B 19/00* (2013.01); *E05B 15/16* (2013.01); *Y10T 29/49826* (2015.01)

(58) Field of Classification Search
CPC .......................... G09B 9/003; A62C 99/0081
USPC .................................. 434/219, 216; 52/204.1
See application file for complete search history.

(56) References Cited

U.S. PATENT DOCUMENTS

| | | | | |
|---|---|---|---|---|
| 5,906,493 | A * | 5/1999 | Bishop | 434/226 |
| 6,877,988 | B2 * | 4/2005 | Phillips et al. | 434/226 |
| 7,789,666 | B2 * | 9/2010 | Sovine et al. | 434/226 |
| 7,972,139 | B2 * | 7/2011 | Staub | 434/226 |
| 8,128,408 | B2 * | 3/2012 | Phillips et al. | 434/226 |
| 8,197,257 | B2 * | 6/2012 | Clewis | 434/226 |
| 8,408,917 | B2 * | 4/2013 | Perrone | 434/226 |
| 8,485,825 | B2 * | 7/2013 | Walker | 434/226 |
| 2011/0025076 | A1 * | 2/2011 | Shelley | 292/216 |

* cited by examiner

*Primary Examiner* — Sam Yao
*Assistant Examiner* — Peter J Alley
(74) *Attorney, Agent, or Firm* — AuerbachSchrot LLC; William C. Schrot; Jeffrey I. Auerbach (57) ABSTRACT

A forced entry practice device for a door includes a housing assembly configured to be installed in a cutout of a door and defining a cavity. A support arm extends outwardly from a side portion of the housing assembly and across a major surface of the door. A casing is coupleable to a door jamb of a door frame associated with the door. A first engagement portion is coupled to the casing, and a second engagement portion is coupled to the housing assembly. A retaining member includes a first section receivable in the first engagement portion and a second section receivable in the second engagement portion. The edge of the door is maintained proximate to the door jamb when the retaining member is received in the engagement portions.

14 Claims, 13 Drawing Sheets

FORCED ENTRY PRACTICE DEVICE FOR A DOOR

CROSS REFERENCE TO RELATED APPLICATION AND CLAIM TO PRIORITY

This application is based on U.S. provisional application Ser. No. 61/424,981, filed Dec. 20, 2010, the disclosure of which is incorporated herein in its entirety and to which priority is claimed.

FIELD OF THE INVENTION

The present invention relates to a forced entry practice device for a door including a housing assembly configured to be installed in a cutout of a door, and a casing configured to be installed on an associated door frame.

BACKGROUND OF THE INVENTION

There are several known devices and simulators used to practice forced door entry. One such simulator includes a free-standing apparatus including a base plate upon which a rigid steel door frame is welded, and a steel door connected to the door frame. A holding bracket maintains the door in a closed position. Such a simulator is relatively bulky, heavy, and expensive, requiring a separate area for configuration and use. Other devices provide for a specialized latch system that is installed on a conventional door. However, such devices have not proven commercially viable or practical in use, given the door and/or door frame is prone to being damaged during use, and/or the device is prone to being detached from the door.

Therefore, there is a need for a device for practicing forced door entry that is relatively easy to install and use on a conventional door and door frame, and that may be used repeatedly without damaging the door and/or door frame.

SUMMARY OF THE INVENTION

The present invention is directed to a forced entry practice device for a door. The device includes a housing assembly configured to be installed in a cutout of a door. The housing assembly includes a main body having a first side portion defining a cavity and an opposite second side portion. The first side portion is proximate to an edge of the door. A block is slidably coupled to the housing assembly. The block includes an end portion movable between a first position extending outwardly from the cavity and a second position at least partially disposed within the cavity. A support arm extends outwardly from the second side portion of the housing assembly and across a central portion of the door.

In one embodiment, the end portion of the block includes an edge. The edge is substantially coplanar with the edge of the door when the block is disposed in the first position. A resilient member is disposed within the cavity, which biases the block toward its first position.

In one embodiment, the support arm is a first support arm. The device includes a second support arm. The first and second support arms define a first pair of support arms, which extend outwardly from the second side portion of the housing assembly and across a first major surface of the door. In one implementation, the device also includes third and fourth support arms defining a second pair of support arms. The second pair of support arms extend outwardly from the second side portion of the housing assembly and across a second major surface of the door. The central portion of the door is disposed between the first pair of support arms and the second pair of support arms. The first support arm may be substantially parallel to the third support arm, and the second support arm may be substantially parallel to the fourth support arm.

In one embodiment, the device also includes a casing coupleable to a door jamb of a door frame to which the door is pivotally connected, the door being movable between an open position and a closed position. The casing includes a first engagement member. A second engagement member is coupled to the main body of the housing assembly. A retaining member includes a first portion receivable in the first engagement member and a second portion receivable in the second engagement member. The door is maintained in the closed position when the first and second portions of the retaining member are received in the first and second engagement members, respectively. The retaining member may be formed from wood, wood composite, or plastic. The first portion of the retaining member is decoupled from the second portion when the door is moved from its closed position to its open position and the first and second portions are received in the first and second engagement members, respectively.

In one embodiment, the first engagement member of the casing defines a first opening through which the first portion of the retaining member extends. The second engagement member of the housing assembly defines a second opening through which the second portion of the retaining member extends.

In one embodiment, the casing includes a first section coupleable to a first side of the door jamb and a second section coupleable to an opposing second side of the door jamb. The first section is movably coupled to the second section so that the casing accommodates door jambs of various widths.

The present invention is also directed to a forced entry practice device for a door including a housing assembly configured to be installed in a cutout of a door. The housing assembly includes a main body having a first side portion defining a cavity and an opposite second side portion. The first side portion is proximate to an edge of the door. A first pair of support arms extends outwardly from the second side portion of the housing assembly and across a first major surface of the door. A casing is coupleable to a door jamb of a door frame associated with the door. A first engagement portion is coupled to the casing. A second engagement portion is coupled to the housing assembly. A retaining member includes a first section receivable in the first engagement portion and a second section receivable in the second engagement portion. The edge of the door is maintained proximate to the door jamb when the first and second sections are received in the first and second engagement portions, respectively.

In one embodiment, the device includes a block slidably coupled to the main body of the housing assembly. The block includes an end portion movable between a first position extending outwardly from the cavity and a second position at least partially disposed within the cavity.

In one embodiment, the device includes a second pair of support arms extending outwardly from the second side portion of the housing assembly and across a second major surface of the door. The first pair of support arms may be substantially parallel to the second pair of support arms. Further, the first pair of support arms may be substantially perpendicular to the edge of the door.

In one embodiment, the device also includes an auxiliary member coupleable to the casing. The auxiliary member includes a channel configured to receive a bumper member.

The present invention also relates to a method of installing a forced entry door practice device onto a door and associated door jamb. A casing is clamped onto a door jamb of a door.

The casing includes an engagement member. A portion of the door is removed adjacent the door jamb to form a cutout. A housing assembly including a body, outwardly extending support arms, and a block slidably disposed relative to the body is provided. The support arms are slid over opposing major surfaces of the door until the body is disposed within the cutout. The block is movable toward and away from an edge of the door.

BRIEF DESCRIPTION OF THE DRAWINGS

Like reference numerals have been used to identify like elements throughout this disclosure.

DETAILED DESCRIPTION OF THE INVENTION

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

Figure 1:
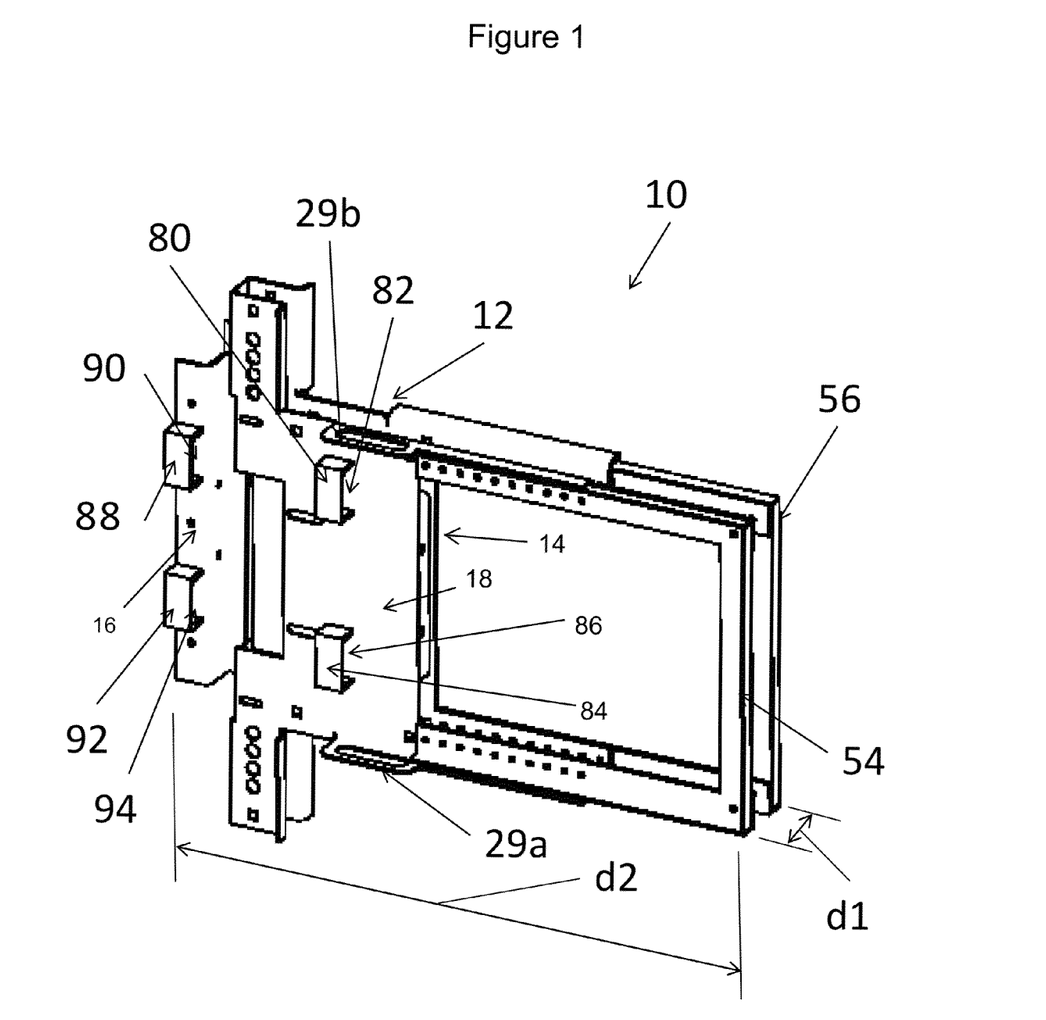
FIG. 1 illustrates a perspective view of a side of a forced entry practice device according to an embodiment of the present invention.
Figure 2:
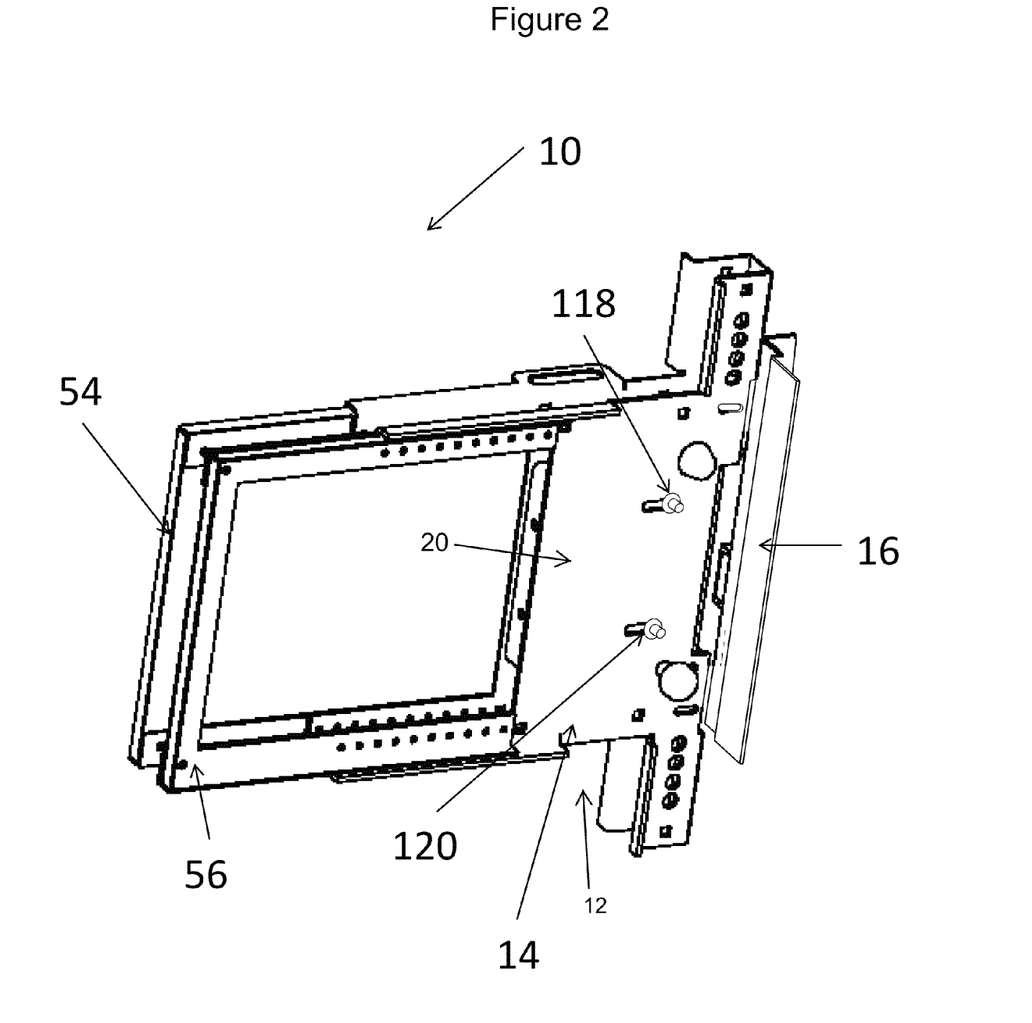
FIG. 2 illustrates a perspective view of the other side of the device of FIG. 1.
Figure 3:
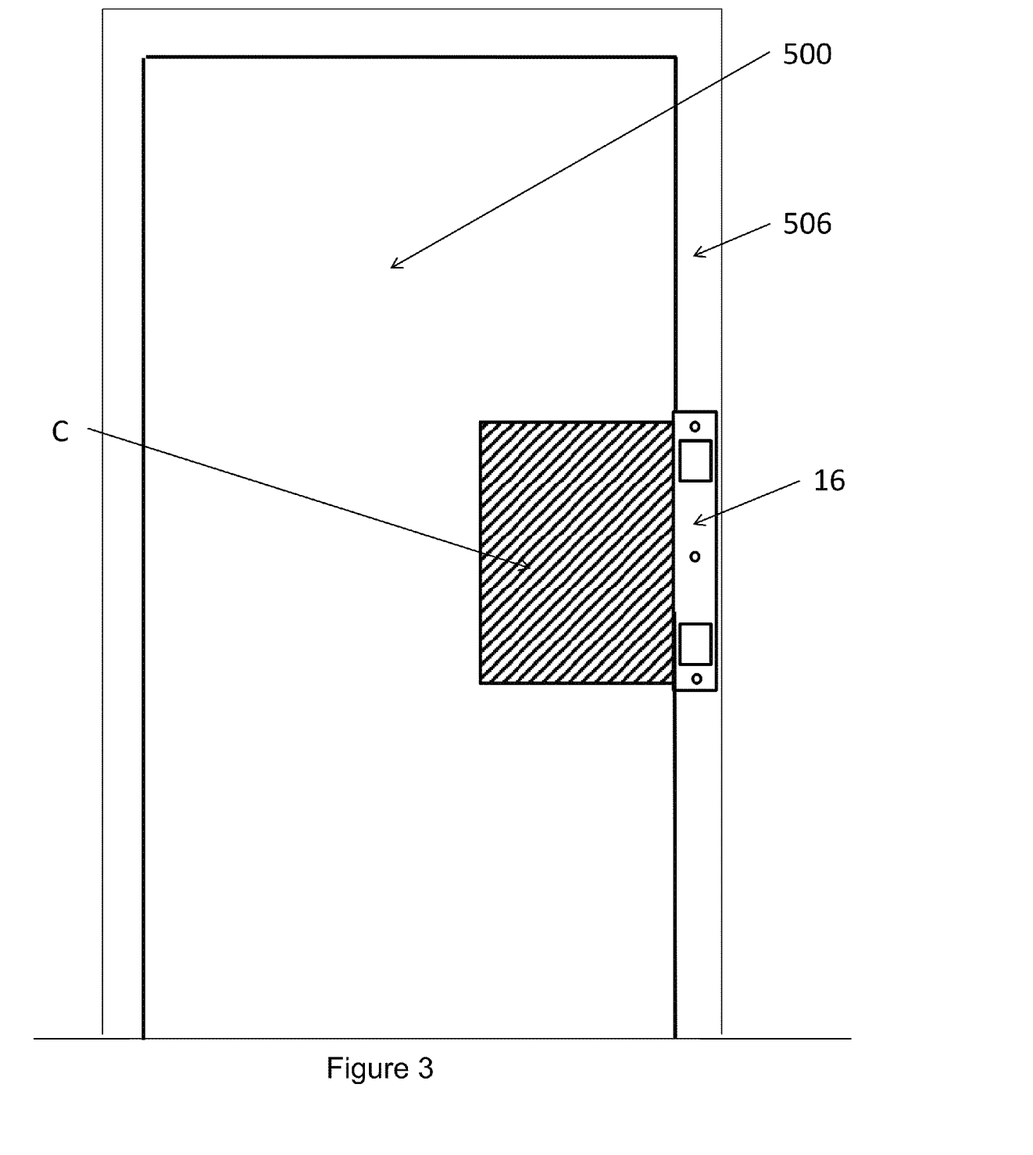
FIG. 3 illustrates a perspective view of a door having a cutout for receiving a housing assembly of the device of FIG. 1.
Figure 4:
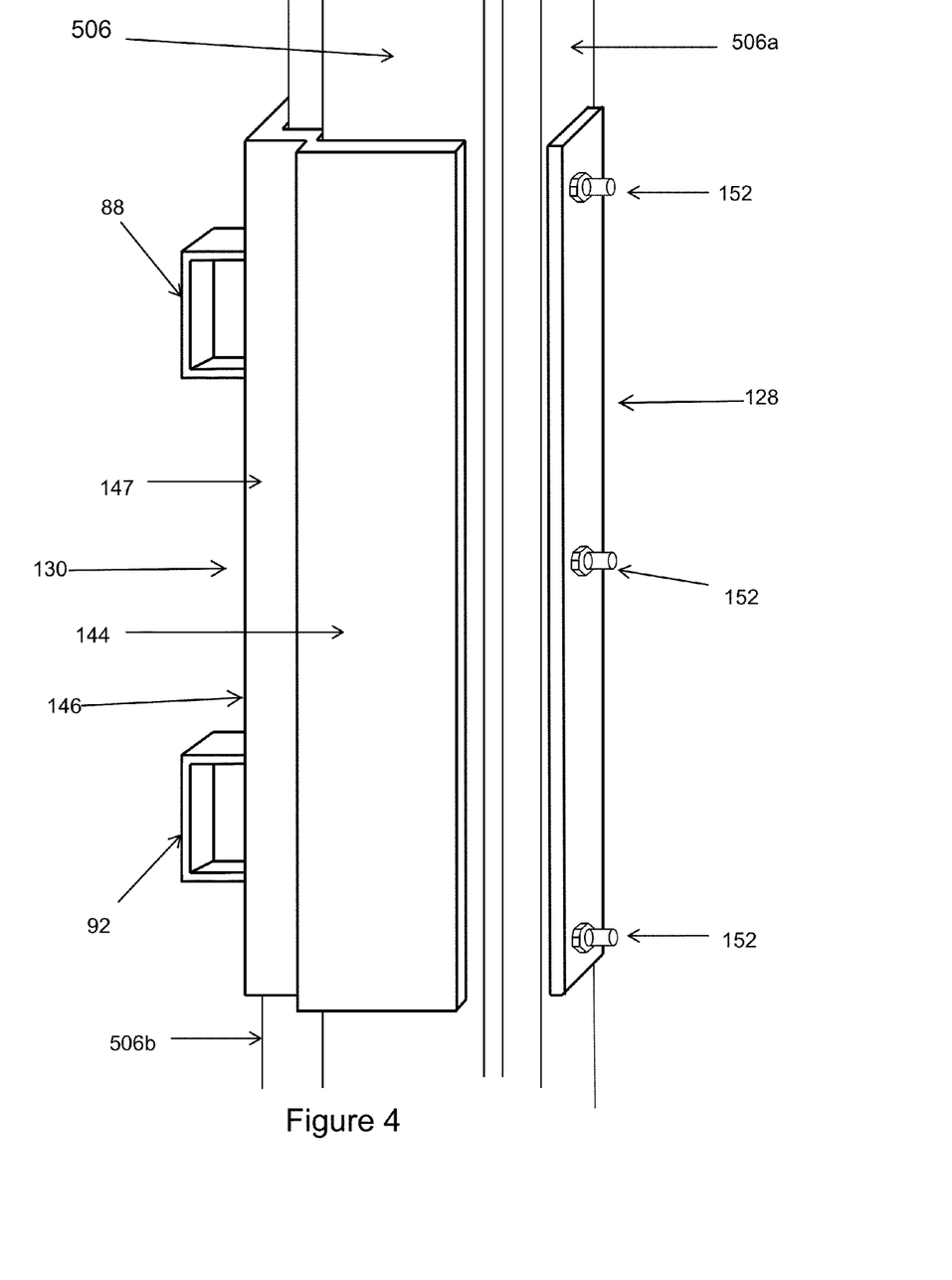
FIG. 4 illustrates a perspective view of a door jamb with a casing of the device of FIG. 1 coupled thereto.
Figure 5:
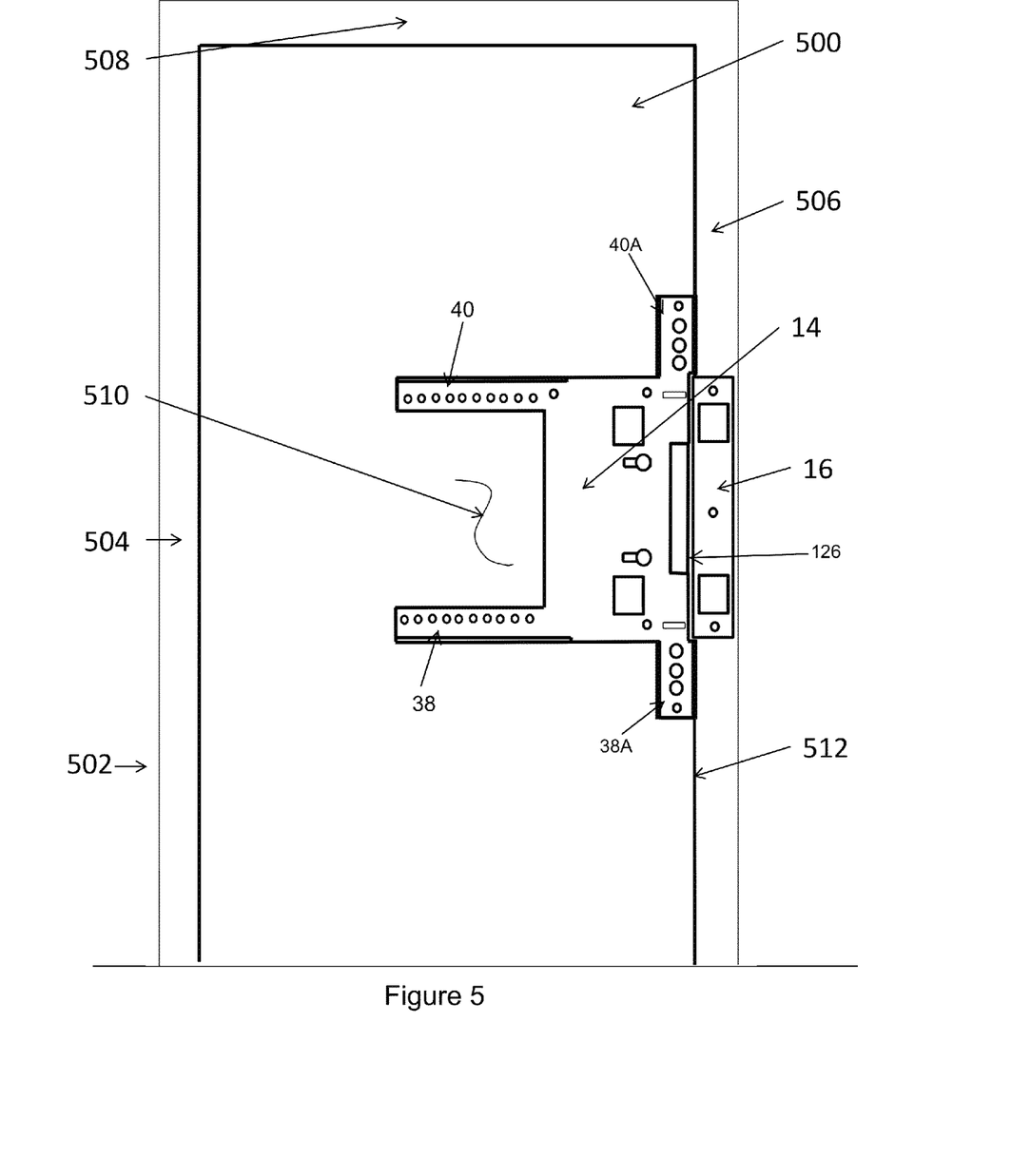
FIG. 5 illustrates a perspective view of a door including the device of FIG. 1 coupled thereto.

FIGS. 1 and 2 illustrate a forced entry practice device 10 according to an embodiment of the present invention. The device 10 includes a housing assembly 12 having a main body 14, and a casing 16. Referring to FIGS. 3, 4 and 5, the main body 14 is configured to be installed in a cutout C (shown in FIG. 3) of a conventional door 500 (as shown in FIG. 5), such as a steel door, a wood door, or a composite door. The casing 16 is configured to be coupled to a door frame 502, such as shown in FIGS. 3 and 4.

As shown in FIG. 5, the door frame 502 includes left and right jambs 504, 506 and a header 508, as known in the art. The door 500 is pivotally coupled to one of the left or right jambs 504, 506. The casing 16 is configured to be coupled to the opposite jamb 504 or 506 to which the door 500 is pivotally coupled. When installed on the door 500 and associated door jamb 506 (or 504), and main body 14 is aligned with the casing 16 when the door 500 is in its closed position, as shown in FIG. 5.

Figure 6:
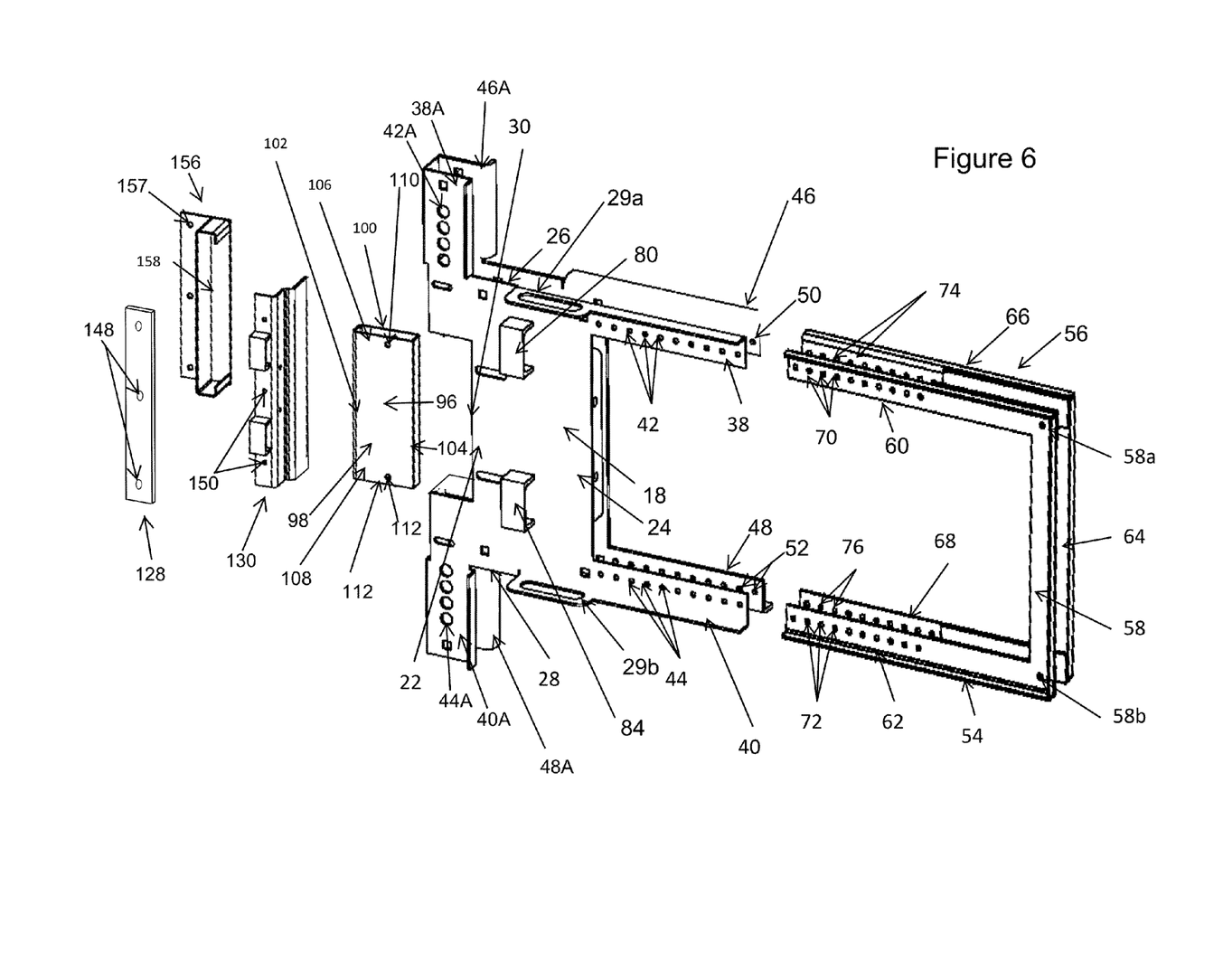
FIG. 6 illustrates a perspective assembly view of the device of FIG. 1.
Figure 7:
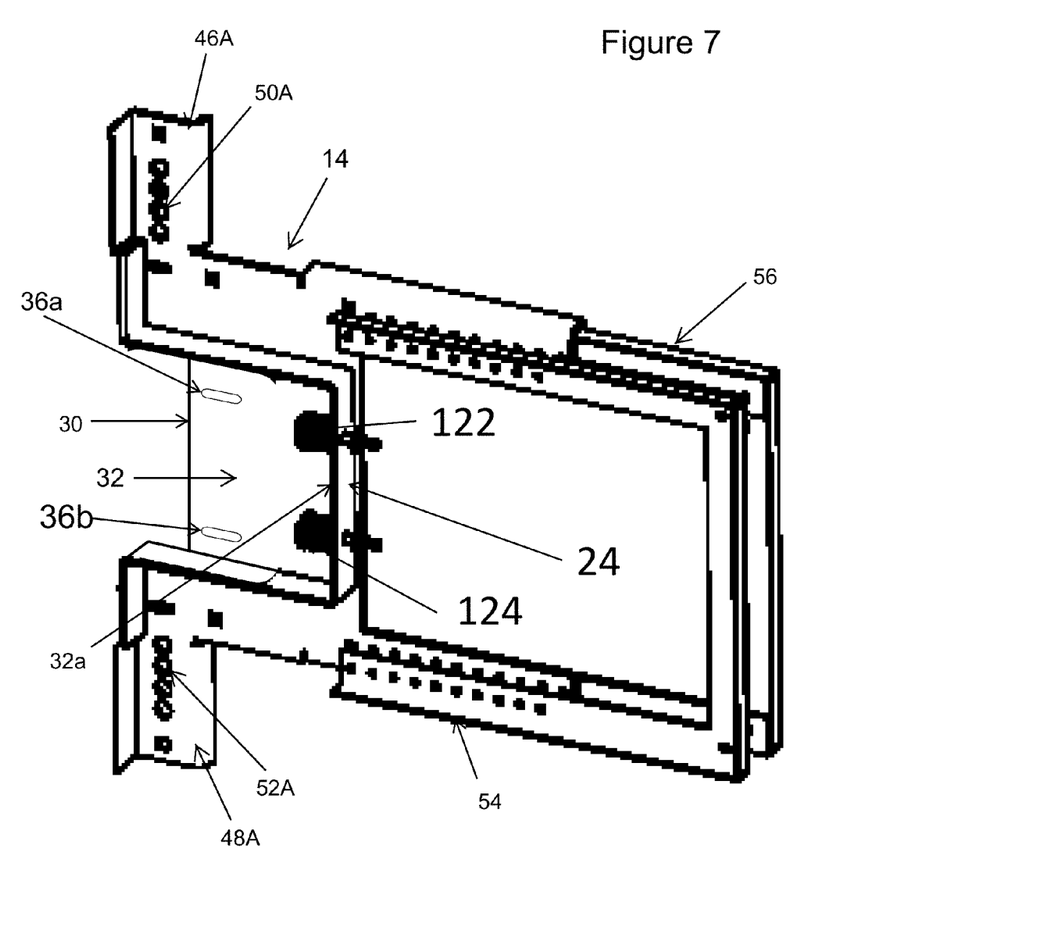
FIG. 7 illustrates a sectional view of a main body of the device of FIG. 1.

Referring to FIGS. 1, 2 and 6, the main body 14 includes a first major surfaces 18 (shown in FIGS. 1 and 6) and an opposing second major surface 20 (shown in FIG. 2), a first side portion 22 and an opposing second side portion 24 (shown in FIG. 6), and a upper edge portion 26 and a lower edge portion 28 (shown in FIG. 6). First and second handle members 29a, 29b are connected to and extend outwardly from the first major surface 18. Referring to FIGS. 6 and 7, the first side portion 22 includes an opening 30 in communication with a cavity 32 (shown in FIG. 7) defined by the main body 14.

Figure 8:
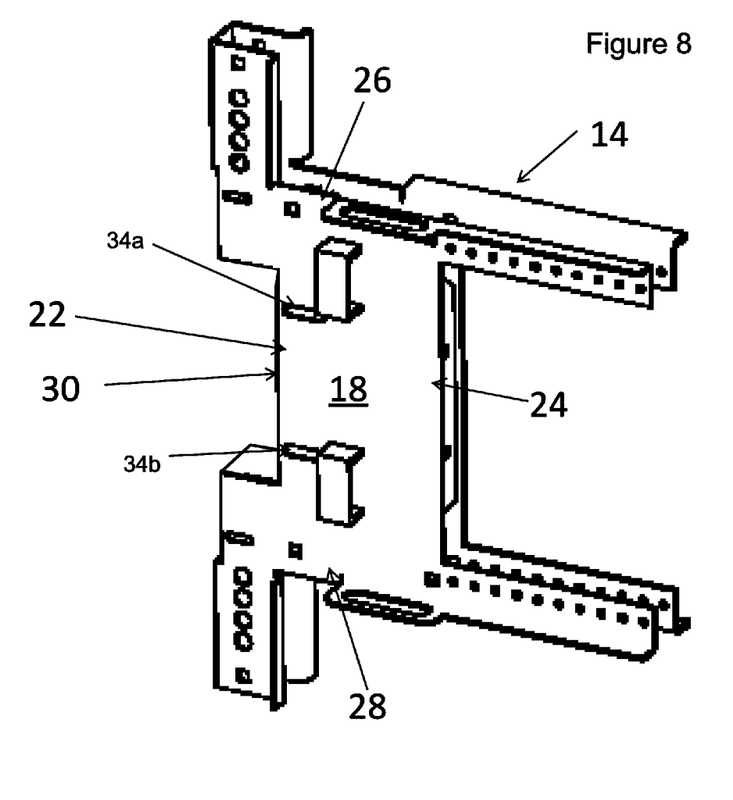
FIG. 8 illustrates an elevational view of the main body of the device of FIG. 1.
Figure 9:
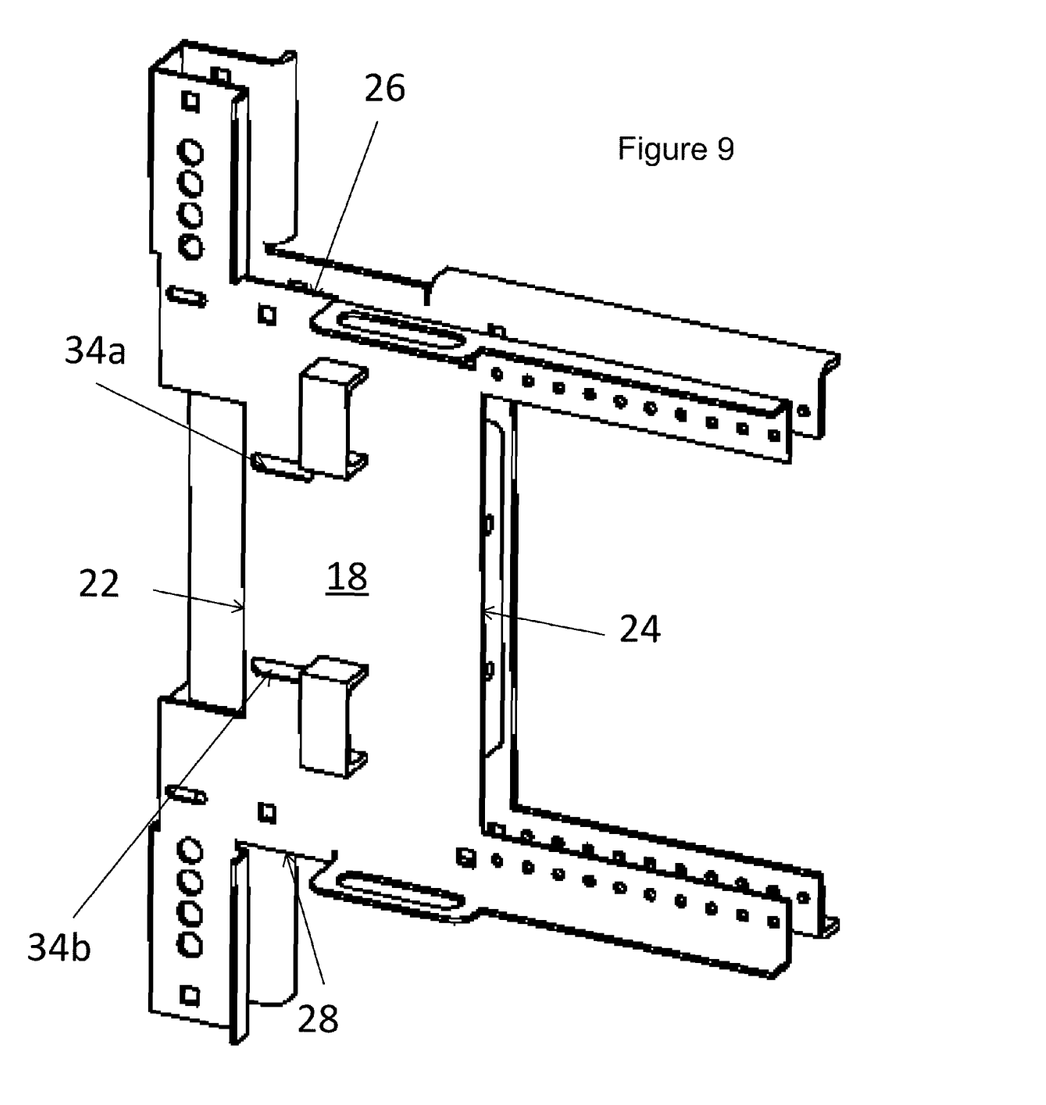
FIG. 9 illustrates an elevational view of the main body and support bracket of the device of FIG. 1, and showing a block movably coupled to the main body.

As shown in FIG. 8, the first major surface 18 defines a slot 34a proximate to the upper edge portion 26, and another slot 34b proximate to the lower edge portion 28. Similarly, as shown in FIG. 7, the second major surface 20 defines a slot 36a proximate to the upper edge portion 26, and another slot 36b proximate to the lower edge portion 28. Slot 34a is aligned with slot 36a, and slot 34b is aligned with slot 36b.

Referring again to FIG. 6, first and second support arms 38, 40 are coupled to and extend outwardly from the second side portion 24 of the main body 14. The first and second support arms 38, 40 define a first pair of support arms 38, 40, which are substantially parallel to each other and extend outwardly from the first major surface 18 of the main body 14. In one implementation, the first support arm 38 extends outwardly from the first major surface 18 and proximate to the upper edge portion 26, and the second support arm 40 extends outwardly from the first major surface 18 and proximate to the lower edge portion 28. Each of the first and second support arms 38, 40 include a plurality of openings 42, 44, respectively.

Third and fourth support arms 46, 48 are coupled to and extend outwardly from the second side portion 24 of the main body 14. The third and fourth support arms 46, 48 define a second pair of support arms 46, 48, which are substantially parallel to each other and extend outwardly from the second major surface 20 of the main body 14. In one implementation, the third support arm 46 extends outwardly from the second major surface 20 and proximate to the upper edge portion 26, and the fourth support arm 48 extends outwardly from the second major surface 20 and proximate to the lower edge portion 28. Each of the third and fourth support arms 46, 48 includes a plurality of openings 50, 52, respectively.

The first pair of support arms 38, 40 are spaced from the second pair of support arms 46, 48 by a distance d1, as shown in FIG. 1. Distance d1 is substantially equal to the thickness of the door 500. Thus, a central portion 510 of the door 500 (adjacent to the formed cutout C, shown in FIG. 5) is received between the first pair of support arms 38, 40 and the second pair of support arms 46, 48.

Note that the orientation of the device 10 relative to the door 500 may be reversed or "flipped upside down", such that the support arm 38 may either be lower or higher than the other support arm 40 relative to a support surface (e.g., the ground or floor). Thus, the selected position and orientation of the device 10 on the door 500 will depend in part on whether the door 500 opens inwardly or outwardly relative to a support structure, room, building, etc., and depending on the side of the door 500 that is hingedly connected to the door frame 502.

As shown in FIG. 6, in one implementation, the first support arm 38 is substantially parallel to and aligned with the third support arm 46, and the second support arm 40 is substantially parallel to and aligned with the fourth support arm 48. The first pair of support arms 38, 40 may be substantially parallel to the second pair of support arms 46, 48. Further, the first pair of support arms 38, 40 and/or the second pair of support arms 46, 48 may be substantially perpendicular to an edge 512 of the door 500 and/or to the jambs 504, 506, as shown in FIG. 5.

Referring to FIGS. 5 and 6, in one embodiment, fifth and sixth support arms 38A, 40A are coupled to and extend outwardly from the first side portion 22 of the main body 14. The fifth and sixth support arms 38A, 40A may be substantially parallel to each other and extend outwardly from the first major surface 18 of the main body 14. In one implementation, the fifth support arm 38A extends outwardly from the first major surface 18 and proximate to the upper edge portion 26, and the sixth support arm 40A extends outwardly from the first major surface 18 and proximate to the lower edge portion 28. However, the fifth and sixth support arms 38A, 40A are configured to extend along the edge 512 of the door 500 (as opposed to extending inwardly toward and across the central portion 510 of the door 500), and outwardly from the main body 14, such as shown in FIG. 5.

Each of the fifth and sixth support arms 38A, 40A includes a plurality of openings 42A, 44A, respectively. The openings 42A, 44A are aligned so that one or more bolts or pins may pass through an aligned pair of openings 42A, 44A, and through correspondingly configured openings formed in the door 500 (e.g., such as by drilling holes through the door 500). In this way, securement of the device 10 on the door 500 may be further enhanced.

Seventh and eighth support arms 46A, 48A are coupled to and extend outwardly from the first side portion 22 of the main body 14. The seventh and eighth support arms 46A, 48A may be substantially parallel to each other and extend outwardly from the second major surface 20 of the main body 14. In one implementation, the seventh support arm 46A extends outwardly from the second major surface 20 and proximate to the upper edge portion 26, and the eighth support arm 48A extends outwardly from the second major surface 20 and proximate to the lower edge portion 28. However, the seventh and eighth support arms 46A, 48A are configured to extend along the edge 512 of the door 500, and outwardly from the main body 14.

Each of the seventh and eighth support arms 46A, 48A may also include a plurality of openings, 50A, 52A, respectively (shown in FIG. 7). Similar to openings 42A, 44A, openings 46A, 48A are aligned so that one or more bolts or pins may pass through an aligned pair of openings 46A, 48A, and through correspondingly configured openings formed in the door 500. Thus, securement of the device 10 on the door 500 may be further enhanced.

With continued reference to FIG. 6, the fifth support arm 38A is spaced from the seventh support arm 46A by distance d1. Likewise, the sixth support arm 40A is spaced from the eighth support arm 48A by distance d1. Thus, the door 500 is received between the fifth and sixth support arms 38A, 40A and the seventh and eighth support arms 46A, 48A.

The fifth support arm 38A may be substantially parallel to and aligned with the seventh support arm 46A, and the sixth support arm 40A may be substantially parallel to and aligned with the eighth support arm 48A. Further, the fifth, sixth, seventh and eighth support arms 38A, 40A, 46A, 48A may be substantially parallel to the edge 512 of the door 500 and/or to the jambs 504, 506, as shown in FIG. 5. Accordingly, the fifth, sixth, seventh and eighth support arms 38A, 40A, 46A, 48A may be substantially perpendicular to the first pair of support arms 38, 40 and/or the second pair of support arms 46, 48.

A first support bracket 54 may be coupled to the first pair of support arms 38, 40, and a second support bracket 56 may be coupled to the second pair of support arms 46, 48. The first support bracket 54 may have a generally U-shaped configuration, with a base member 58 and leg members 60, 62 extending outwardly from opposing ends 58a, 58b of the base member 58, respectively. Similarly, the second support bracket 56 may have a similar configuration, with a base member 64 and leg members 66, 68 extending outwardly from opposing ends thereof.

The leg members 60, 62 of the first support bracket 54 include a plurality of openings 70, 72, respectively, which may be aligned with selected openings 42, 44 in the first and second support arms 38, 40, respectively, as shown in FIG. 1. The first support bracket 54 may be connected to the first pair of support arms 38, 40 via fasteners (e.g., pins, bolts, screws, etc), which extend through the openings 70, 72 in the leg members 60, 62 and through the correspondingly aligned openings 42, 44 in the first and second support arms 38, 40.

Similarly, the leg members 66, 68 of the second support bracket 56 include a plurality of openings 74, 76, respectively, which are alignable with selected openings 50, 52 in the third and fourth support arms 46, 48, respectively, as shown in FIG. 2. The second support bracket 56 may be connected to the second pair of support arms 46, 48 via fasteners (e.g., pins, bolts, screws, etc), which extend through the openings 74, 76 in the leg members 66, 68 and through the correspondingly aligned openings 50, 52 in the third and fourth support arms 46, 48.

The pluralities of openings 42, 44, 50, 52 in the first pair of support arms 38, 40 and in the second pair of support arms 46, 48, as well as the pluralities of openings 70, 72, 74, 76 in the first and second support brackets 54, 56, allow the distance between the base members 58, 64 of the first and second support brackets 54, 56 and the main body 14 of the housing assembly 12 to be adjusted. As such, the overall length d2 (shown in FIG. 1) of the device 10 may be adjusted. In this way, the device 10 may be secured to various doors (e.g. door 500) having differing widths, with the support brackets 54, 56 and main body 14 collectively extending across substantially the entire width of the door 500. In this way, substantial support is provided to the door 500, and the housing assembly 12 is securely maintained within the cutout C. When a force is applied to the housing assembly 12 (e.g., such as when a user pries the door open and/or batters the main body 14 of the housing assembly 12 with a ram, as described below), the force is distributed across substantially the entire width of the door 500, as opposed to only the area surrounding or proximate to the cutout C of the door 500. Thus, the possibility of inadvertently knocking the main body 14 or other portions of the housing assembly 12 out of the cutout C and/or damaging the door 500 is minimized.

Thus, the "footprint" of the device 10 on the major surfaces of the door 500 may be substantially increased by the support arms 38, 38A, 40, 40A, 46, 46A, 48, 48A and by the support brackets 54, 56, and without increasing the size of the cutout C. In this way, the size of the cutout C may be minimized, thereby utilizing the strength of the door 500. Moreover, the strength of the door 500, and in particular its ability to withstand impact forces due to forced entry practice, is maximized by the extending support arms and support brackets. The force of an impact is distributed across a greater surface area of the door 500 by the support arms and support brackets, thereby minimizing the possibility of damage to the door. The capability and configuration of the disclosed device 10 thereby provides a tremendous advantage of prior devices, which were prone to being damaged or dislodged from a conventional door and/or likely to cause damage to a door during use.

Referring again to FIGS. 1 and 6, the main body 14 of the housing assembly 12 includes a first engagement member 80 extending outwardly from the first major surface 18 thereof and which defines an opening 82. The main body 14 also includes a second engagement member 84 extending outwardly from the first major surface 18 thereof and which defines another opening 86. The casing 16 also includes a first engagement member 88 which defines an opening 90, and a second engagement member 92 which defines another opening 94.

When the casing 16 is properly installed on the door jamb 506 and the housing assembly 12 is installed on the door 500, and the door 500 is in a closed position, the openings 82, 86 of the engagement members 80, 84 of the main body 14 are aligned with the openings 90, 94 of the engagement members 88, 92 of the casing 16, as shown in FIG. 1.

Figure 10:
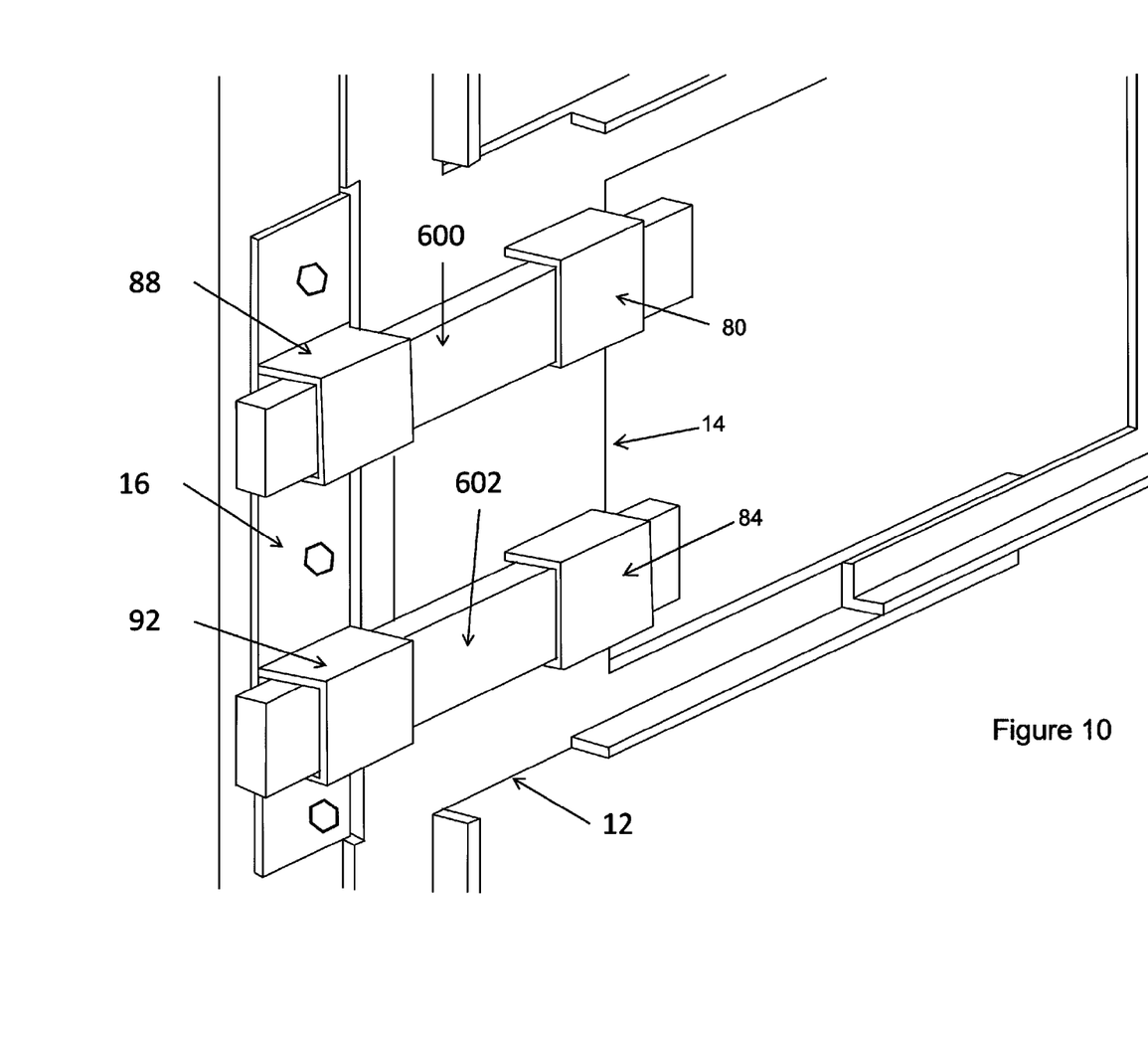
FIG. 10 illustrates a perspective view of portions of the device of FIG. 1 and showing retaining members coupled thereto.
Figure 11:
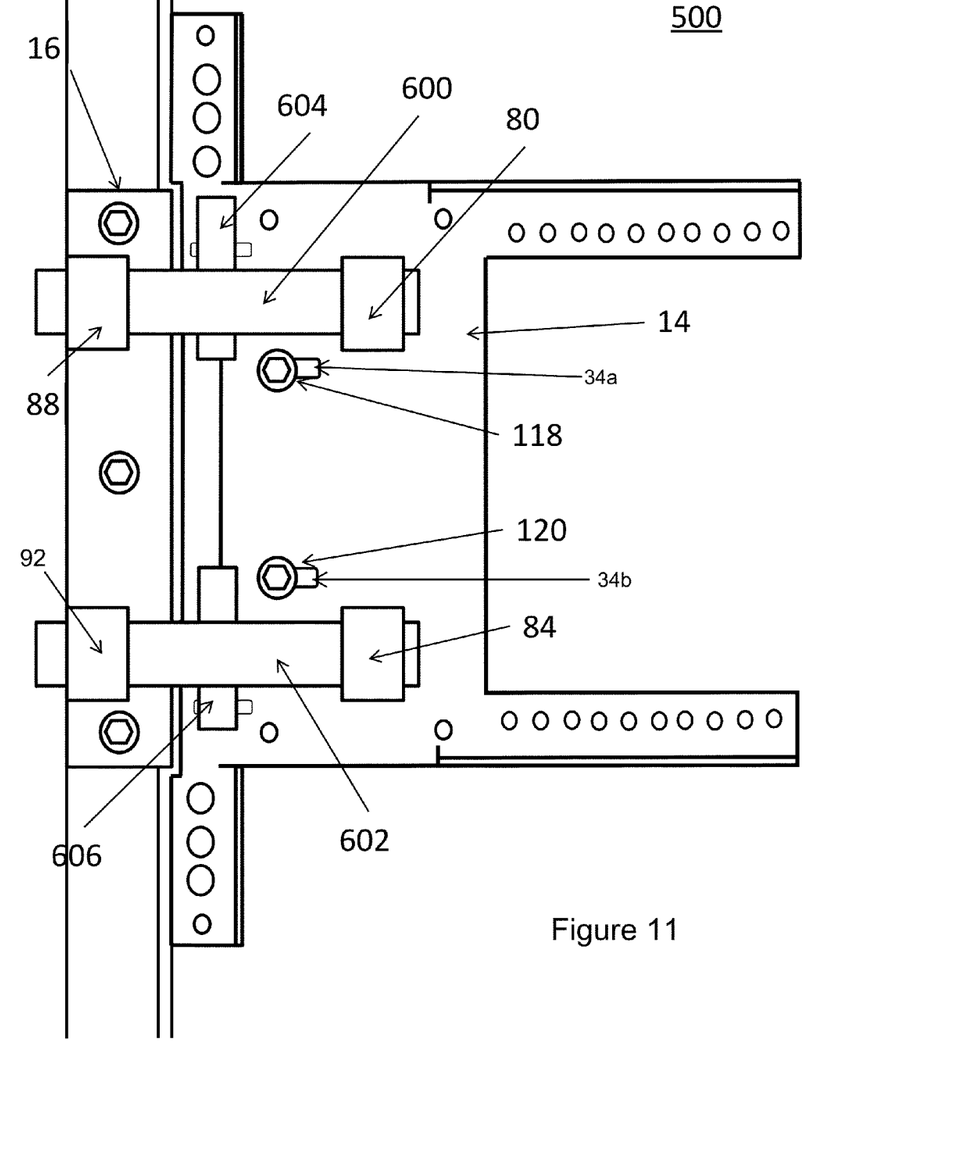
FIG. 11 illustrates another perspective view of the device of FIG. 1 and showing retaining members and shims coupled thereto.

Referring to FIGS. 10 and 11, one or more retaining members 600, 602 are provided, which may be coupled to the engagement members 80, 84 of the main body 14 and the engagement members 88, 92 of the casing 16 to retain the door 500 in its closed position. Each of the retaining members 600, 602 may be formed from wood, wood composite, plastic, or some other material which may be forcibly broken or decoupled into two or more pieces. For example, each of the retaining members 600, 602 may be a section of a wood (e.g., a length of 2×4 wood). A portion of one of the retaining members 600 is received in the opening 82 of the engagement member 80 of the main body 14, and another portion of the retaining member 600 is received in the opening 90 of the engagement member 88 of the casing 16. Similarly, a portion of the other retaining member 602 is received in the opening 86 of the other engagement member 84 of the main body 14, and another portion of the retaining member 602 is received in the opening 94 of the other engagement member 92 of the casing 16.

If the retaining members 600, 602 do not sufficiently retain the door 500 in a fully closed position (e.g., such as if the door 500 is permitted to crack open a slight distance due to a gap between the retaining members 600, 602 and the door 500), additional shims 604, 606 may be wedged between the door 500 and the retaining members 600, 602, as shown in FIG. 11. Thus, the door 500 may be maintained in a fully closed position by the retaining members 600, 602 and optionally the shims 604, 606, which cooperate with the engagement members 80, 84 of the main body 14 and the engagement members 88, 92 of the casing 16.

With continued reference to FIG. 11, according to one method of using the forced entry practice device 10, one or both of the retaining members 600, 602 (and optionally shims 604, 606) are coupled to the engagement members 80, 84, 88, 92 of the main body 14 and the casing 16, respectively. The door 500 is thus disposed in its fully closed position. The door 500 is moved from its closed position to an open position by breaking or decoupling the portions of the retaining members 600, 602 from each other upon application of a predetermined amount of force (described in further detail below).

Figure 12:
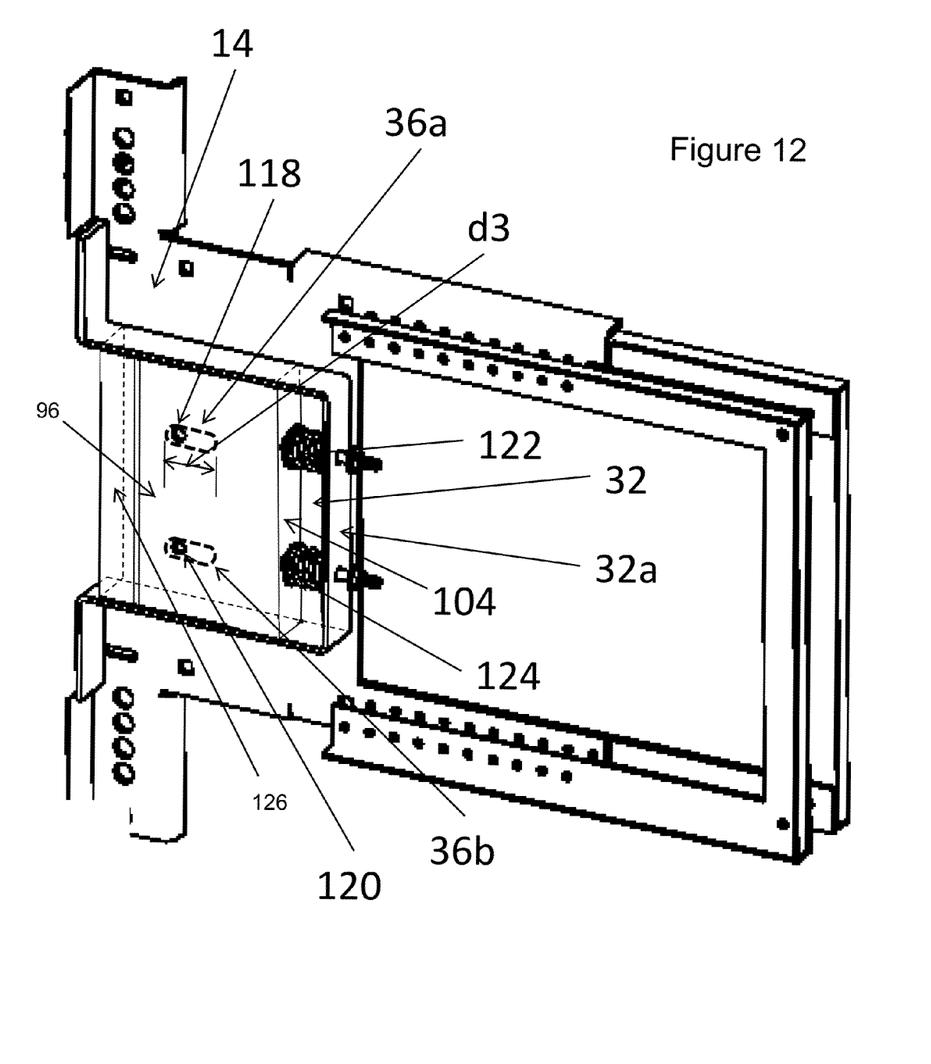
FIG. 12 illustrates an elevational view of the housing assembly of the device of FIG. 1 and showing the block within a cavity of the main body in an outwardly extending position in phantom.

Referring to FIGS. 6 and 12, a block 96 is slidably coupled to the main body 14 of the housing assembly 12. In one implementation, the block 96 has a substantially rectangular configuration, including opposing first and second faces 98, 100, an outer end portion 102 and opposing inner end portion 104, and a top portion 106 and opposing bottom portion 108. The block 96 is configured to be received through the opening 30 and at least partially into the cavity 32 (as shown in FIG. 12) of the main body 14.

With continued reference to FIG. 6, in one embodiment, the block 96 includes a first pair of apertures 110, 112 extending through the first face 98, and a second pair of apertures (not shown) extending through the second face 100. The first pair of apertures 110, 112 is aligned with the second pair of apertures so that first and second pins or bolts 118, 120 (shown in FIGS. 2 and 11) may extend through the correspondingly aligned apertures 110, 112. Ends of the pins 118, 120 extend outwardly from the corresponding first and second faces 98, 100 of the block 96. In another embodiment, each of the first and second faces 98, 100 of the block 96 includes integrally formed or coupled projections extending outwardly therefrom.

In either case, the outwardly extending pins 118, 120 of the first face 98 of the block 96 are received in the first pair of slots 34*a*, 34*b* of the first major surface 18 of the main body 14, as shown in FIG. 11. The outwardly extending pins 118, 120 of the second face 100 of the block 96 are received in the second pair of slots 36*a*, 36*b* of the second major surface 20 of the main body 14. Referring to FIG. 12, the pins 118, 120 are slidable within the corresponding slots 34*a*, 34*b*, 36*a*, 36*b*, so that the block 96 is movably coupled to the main body 14 of the housing assembly 12. In this way, the block 96 is slidably movable relative to the main body 14. Further, the outer end portion 102 of the block 96 is movable toward and away from the main body 14 a predetermined distance d3 (corresponding to the permitted movement of the pins 118, 120 within the slots 34*a*, 34*b*, 36*a*, 36*b*).

Referring again to FIGS. 7 and 12, resilient members 122, 124 are disposed within the cavity 32 of the main body 14, and disposed between a base 32*a* of the cavity 32 and the inner end portion 104 of the block 96. The outer end portion 102 of the block 96 is biased outwardly and away from the base 32*a* of the cavity 32 via the resilient members 122, 124. When the housing assembly 12 is installed within the cutout C of the door 500, an outer edge 126 of the block 96 is substantially coplanar with the edge 512 of the door 500 (shown in phantom in FIG. 12, and as shown in FIG. 5) when the block 96 is disposed in its outwardly biased position (e.g., when no inwardly directed force is being applied to the block 96, as described in further detail below).

Referring again to FIGS. 4 and 6, the casing 16 includes a first component 128 coupleable to a first side 506*a* of the door jamb 506 and a second component 130 coupleable to an opposing second side 506*b* of the door jamb 506. In one embodiment, the first component 128 of the casing 16 has a generally rectangular or plate-like configuration including opposing major surfaces.

The second component 130 of the casing 16 includes a first section 144 and a second section 146 spaced by an interface or stepped section 147. The engagement members 88, 92 extend outwardly from and are coupled to the second section 146. The first component 128 includes one or more holes or openings 148, and the second component 130 includes one or more holes or openings 150. The first component 128 may be coupled to the second component 130 by aligning selected openings 148 of the first component 128 with corresponding openings 150 of the second component 130, and then securing the first and second components 128, 130 together via bolts 152, pins, etc., which pass through the aligned holes 148, 150. Given the length of the bolts 152 or other pins may be readily selected and/or adjusted, the spacing between the first component 128 and the second component 130 may be readily adjusted. In this way, the casing 16 may be clamped around and accommodate door jambs of various widths. As shown in FIG. 4, bolts 152 extend through the door jamb 506, and connect the first component 128 to the second component 130.

With continued reference to FIG. 6, in one embodiment, the device 10 also includes an auxiliary member 156 selectively coupleable to the casing 16. For example, the auxiliary member 156 may include one or more openings 157 alignable with openings 148 so that the bolts 152 may also pass through openings 157, thereby securing the auxiliary member 156 to the first component 128. The auxiliary member 156 includes or defines a channel 158 configured to receive a bumper member, which may be similar to the retaining member (e.g. a piece of 2×4 wood, or section of material formed from wood, wood composite, plastic, etc.). The bumper member (not shown) may be inserted into the channel 158. When prying open the door 500 using a tool (such as a Halligan tool 700, shown in FIG. 13), the user may pivot the tool against the bumper member. The bumper member may split or crack, while the casing 16 and/or door jamb 506 remain undamaged. The bumper member may also be used for alternative methods of forced entry.

Figure 13:
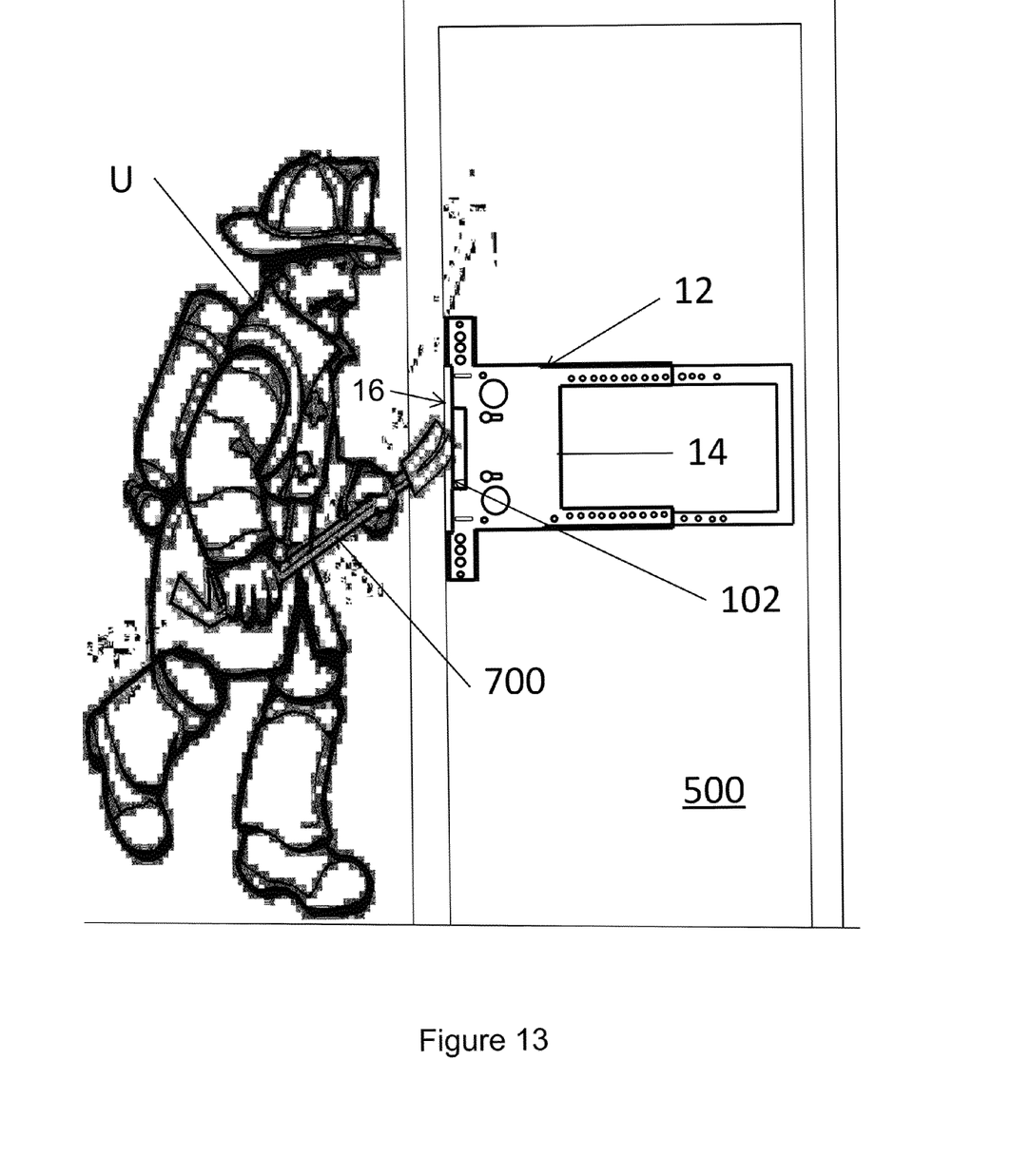
FIG. 13 illustrates a perspective view of the device of FIG. 1 coupled to a door and associated frame and showing a user prying open the door using a Halligan tool.

Referring to FIG. 13, in one implementation, an axe or wedge-type tool 700 (e.g., a Halligan tool) may be forced between the casing 16 and the outer end portion 102 of the block 96. As the handle or portion of the tool 700 that is being grasped by a user U is pivoted away from the door 500, the outer end portion 102 of the block 96 is forced toward the cavity 32, as described above. Thus, damage to the door 500 is eliminated or minimized, given the inward force of the tool 700 is absorbed by the block 96, which compresses the resilient members 122, 124 within the cavity 32. In addition, the door 500 may then be forced inwardly and toward an open position, such as by hooking or engaging an end of the tool 700 on the stepped second 147 of the casing 16 and then pivoting the tool 700 inwardly. Thus, the tool 700 acts as a lever to force the door 500 open, as known in the art. The door 500 is retained in its closed position until the retaining members 600, 602 are broken or split, at which point the door 500 is forcibly moved from its closed position to its open position. Thus, it is primarily the retaining members 600, 602 (and optionally shims 604, 606) that retain the door 500 in its closed position (as opposed to the block 96 and/or conventional latch mechanism).

In another implementation, a hydraulic tool or battering ram type tool may be used to force the door 500 from a closed position to an open position. The tool is rammed (either via the hydraulic tool or via the battering ram tool) against the first or second major surface 18 or 20 of the main body 14 until the retaining members 600, 602 (and optionally shims 604, 606) are broken or split, thereby forcibly moving the door 500 from its closed to its open position.

Installation of the forced entry door practice device 10 on a door 500 and associated door frame 502 is relatively easy, and may be installed on a wide variety of differently configured doors. The casing 16 is clamped onto the door jamb (e.g. jamb 506, such as shown in FIG. 4) against which the edge 512 of the door 500 opens and closes. The first component 128 of the casing 16 abuts one side (e.g. 506a) of the jamb and the second component 130 abuts the opposing side (e.g. 506b) of the jamb. In order to install the housing assembly 12, a portion of the door 500 is removed to form a cutout C (e.g., such as shown in FIG. 3). The main body 14 of the housing assembly 12 is then slide into the cutout C, with the first pair of support arms 38, 40 and associated support bracket 54 engaging and extending across one major surface of the door 500 (such as shown in FIG. 5), and the second pair of support arms 46, 48 and associated support bracket 56 engaging and extending across the opposite major surface of the door 500. The main body 14 of the housing assembly 12 is positioned within the cutout C so that the block 96 is aligned with the edge 512 of the door 500. The block 96 is movable toward and away from the edge 512 of the door 500 as described above, such as when practicing forcible entry of the door 500.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims.

For example, although each of the retaining members 600, 602 may be formed from a single piece of material, retaining members including two or more discrete but coupled together sections may be provided. For example, retaining members including two or more detachably coupled sections may be provided, whereby the sections detach from each other upon application of a predetermined amount of force. Accordingly, such retaining members may be formed from wood, wood composite, or plastic, as described above, as well as metal or metal composites that are detachably coupled via adhesive, pins, magnetically, etc.

Further, although the device is illustrated as including eight support arms, it should be understood that fewer or more of such support arms may be provided. Further, the specific configuration of the support arms may vary. Similarly, the number and configuration of the support brackets illustrated herein is exemplary, and may likewise vary without departing from the scope and spirit of the invention. In addition, various features from one of the embodiments may be incorporated into another of the embodiments.

Accordingly, it is appropriate that the appended claims be construed broadly and in a manner consistent with the scope of the disclosure as set forth in the following claims.

What is claimed is:

1. A forced entry practice device for a door, comprising:
a housing assembly configured to be installed in a cutout of a door, the door pivotally connected to a door frame and movable between an open position and a closed position, the housing assembly defining a cavity and having an opening in communication with the cavity, the opening proximate to an edge of the door when the housing assembly is installed in the cutout, and the housing assembly including a slot extending through a side portion thereof and in communication with the cavity;
a block slidably coupled to the housing assembly, the block including an end portion movable between a first position extending outwardly from the cavity and a second position at least partially disposed within the cavity;
a pin connected to and extending outwardly from the block, the pin received in and slidable between opposing ends of the slot, thereby limiting movement of the end portion of the block relative to the housing assembly by a predetermined distance;
a first support arm extending outwardly from the housing assembly and disposable across a first face of the door, and a second support arm extending outwardly from the housing assembly and disposable across a second face of the door, so that a central portion of the door is disposed between the first support arm and the second support arm when the housing assembly is installed in the cutout;

a third support arm extending outwardly from the housing assembly and disposable across the first face adjacent to the edge of the door, and a fourth support arm extending outwardly from the housing assembly and disposable across the second face adjacent to the edge of the door, so that a portion of the door adjacent to the edge thereof is disposed between the third support arm and the fourth support arm when the housing assembly is installed in the cutout;

a casing configured to be coupleable to a door jamb of the door frame, the casing including a first engagement member;

a second engagement member coupled to the housing assembly; and a retaining member including a first portion receivable in the first engagement member when the casing is coupled to the door jamb, and a second portion receivable in the second engagement member when the housing assembly is installed in the cutout, the door maintained in the closed position when the first and second portions of the retaining member are received in the first and second engagement members, respectively.

2. The device of claim 1, wherein the end portion of the block includes an edge, the edge being substantially coplanar with the edge of the door when the block is disposed in the first position.

3. The device of claim 1, wherein the first support arm is substantially parallel to the second support arm.

4. The device of claim 1, wherein the retaining member is formed from a material selected from the group consisting of wood, wood composite, and plastic.

5. The device of claim 1, wherein the first portion of the retaining member is decoupled from the second portion when the door is moved from its closed position to its open position and the first and second portions are received in the first and second engagement members, respectively.

6. The device of claim 1, wherein the first engagement member defines a first opening through which the first portion of the retaining member extends, and the second engagement member defines a second opening through which the second portion of the retaining member extends.

7. The device of claim 1, wherein the casing includes a first section coupleable to a first side of the door jamb and a second section coupleable to an opposing second side of the door jamb.

8. The device of claim 7, wherein the first section is movably coupled to the second section so that the casing accommodates door jambs of various widths.

9. The device of claim 1, further comprising a resilient member disposed within the cavity, the resilient member biasing the block toward its first position.

10. A forced entry practice device for a door, comprising:
a housing assembly configured to be installed in a cutout of a door, the door pivotally connected to a door frame and movable between an open position and a closed position, the housing assembly defining a cavity and having an opening in communication with the cavity, the opening proximate to an edge of the door when the housing assembly is installed in the cutout, and the housing assembly including a slot extending through a side portion thereof and in communication with the cavity;

a block slidably coupled to the housing assembly, the block including an end portion movable between a first position extending outwardly from the cavity and a second position at least partially disposed within the cavity;

a pin connected to and extending outwardly from the block, the pin received in and slidable between opposing ends of the slot, thereby limiting movement of the end portion of the block relative to the housing assembly by a predetermined distance;

a first pair of support arms extending outwardly from the housing assembly and disposable across a central portion of the door;

a second pair of support arms extending outwardly from the housing assembly and disposable along an edge of the door, the second pair of support arms substantially perpendicular to the first pair of support arms;

a casing coupleable to a door jamb of a door frame associated with the door;

a first engagement portion coupled to the casing;

a second engagement portion coupled to the housing assembly; and a retaining member including a first section receivable in the first engagement portion when the casing is coupled to the door jamb, and a second section receivable in the second engagement portion when the housing assembly is installed in the cutout, the edge of the door maintained proximate to the door jamb when the first and second sections are received in the first and second engagement portions, respectively.

11. The device of claim 10, wherein the retaining member is formed from a material selected from the group consisting of wood, wood composite, and plastic.

12. The device of claim 10, further comprising an auxiliary member coupleable to the casing, the auxiliary member including a channel configured to receive a bumper member.

13. The device of claim 10, wherein the first pair of support arms includes a first support arm and a second support arm, the first support arm extendable across a first face of the central portion of the door, and the second support arm extendable across a second face of the door, so that the central portion of the door is disposed between the first support arm and the second support arm when the housing assembly is installed in the cutout.

14. The device of claim 10, wherein the second pair of support arms includes a first support arm and a second support arm, the first support arm extendable across the first face and along the edge of the door, and the second support arm extendable across the second face and along the edge of the door, so that a portion of the door adjacent to the edge thereof is disposed between the first support arm and the second support arm when the housing assembly is installed in the cutout.

* * * * *